United States Patent

[11] 3,602,975

[72] Inventors Raymond L. Thurston
1649 Tina Lane, Flossmoor, Ill. 60422;
Ronald E. Lang, 5472 Holly Road, Holly, Mich. 48442
[21] Appl. No. 778,000
[22] Filed Nov. 14, 1968
[45] Patented Sept. 7, 1971
Continuation of application Ser. No. 570,935, Aug. 8, 1966, now abandoned.

[54] HELICAL COIL INSERT TOOL
2 Claims, 6 Drawing Figs.
[52] U.S. Cl. .................................................. 29/240.5
[51] Int. Cl. ............................................... B23p 19/04

[50] Field of Search ......................................... 29/240.5

[56] References Cited
UNITED STATES PATENTS

| | | | |
|---|---|---|---|
| 2,584,118 | 2/1952 | Forster ........................ | 29/240.5 |
| 2,839,823 | 6/1958 | Brancato ..................... | 29/240.5 X |
| 3,093,895 | 6/1963 | Eddy ............................ | 29/240.5 |

*Primary Examiner*—Robert C. Riordon
*Assistant Examiner*—J. C. Peters
*Attorney*—Harness, Dickey & Pierce ABSTRACT: The installation tool applies a helical coiled wire insert in the threaded aperture of an element by first applying it to a section of a thread in a sleeve to reduce its diameter before screwing it into the full thread of the sleeve and element.

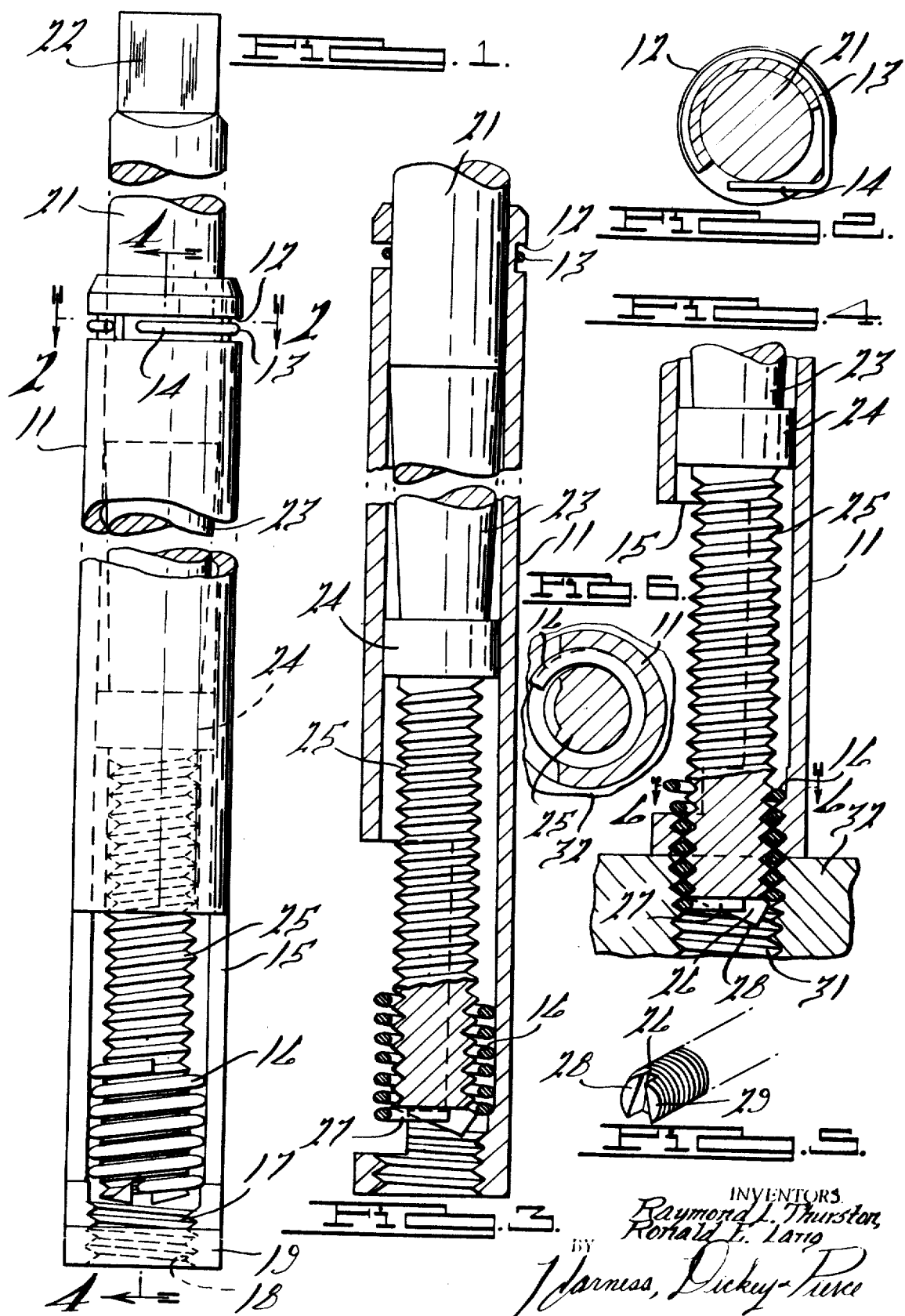

3,602,975

HELICAL COIL INSERT TOOL

CROSS REFERENCE TO RELATED APPLICATION

This is a continuation of the prior copending application of Raymond L. Thurston et al. Ser. No. 570,935, filed Aug. 8, 1966, and now abandoned for HELICAL COIL INSERT TOOL.

SUMMARY OF THE INVENTION

The tool of the present invention is employed for rotating a wire coil insert into a tapped hole in a soft material from which the screw is to be repeatedly removed and inserted. Such material could be aluminum, plastic, wood and other substances and compositions which would quickly deteriorate from use. The tool comprises a sleeve and a driving member which is freely movable longitudinally within the sleeve. The forward end of the driving member is threaded with the same lead as that provided within the end of the sleeve in which the coiled wire insert is contracted to a predetermined diameter. In other words, the coiled wire insert has a greater diameter than is required so that it will be tensioned when wound to a predetermined diameter and thereby produce a friction engagement with the wall of the nut or tapped aperture which will prevent it from moving relative thereto when a threaded element is screwed thereinto or therefrom. The forward end of the coiled wire insert has a diametrically disposed tang or straight portion which is engaged by diametrical slots on the end of the driving member which is axially movable within the insert. As the tang is rotated by the driving member and urged forwardly, it will be contracted to mate with the thread within the end of the sleeve and with the thread of the driving member and thereby be screwed from the thread of the sleeve into the thread of the tapped hole. When driven into the hole from the sleeve, the wire of the insert will expand into the thread of the tapped hole and form a more permanent thread therein. The expansion of the thread in this manner produces frictional engagement within the thread in the tapped hole and will prevent the wire insert from screwing therefrom when a threaded element is screwed from the hole. When the threaded element is to pass entirely through the workpiece having the tapped hole, the diametrical tang is severed from the wire insert so that the screw can pass therebeyond.

Accordingly, the main objects of the invention are; to provide an installation tool with sleeve having a thread at the end and a slot which cuts a portion of the thread into half sections which forces the wire coils of an insert into the continuous thread portion to reduce the diameter thereof; to engage an axially movable driving member with a tang on a coiled wire insert for forcing the insert into mating engagement with threads of a sleeve and those on the member as the coil is reduced in diameter and advance into the thread of a tapped aperture which is to be threaded thereby; to provide a driving tool for a coiled wire insert which has a sleeve for receiving the insert and an axial moving rotatable driving member which is locked therewith against accidental removal; to provide a sleeve of an installation tool with a driving member which is movable axially therein and advanced with a coiled wire insert as it is rotated by the member in the thread in the sleeve and reduced in diameter to mate with the thread of driving member, and in general, to provide an installation tool which is simple in construction, positive in operation and economical of manufacture.

Other objects and features of novelty of the invention will be specifically pointed out or will become apparent when referring, for a better understanding of the invention, to the following description, taken in conjunction with the accompanying drawing.

BRIEF DESCRIPTION OF THE DRAWING

FIG. 1 is a broken view in elevation of a installation tool embodying features of the present invention;

FIG. 2 is a broken sectional view of the structure illustrated in FIG. 1, taken on the line 2—2 thereof;

FIG. 3 is a broken sectional view of the structure illustrated in FIG. 1, taken on the line 3—3 thereof;

FIG. 4 is a view of structure, similar to that illustrated in FIG. 3, showing the application of a coiled wire insert to a tapped aperture FIG. 5 is a broken perspective view of the end of the driving member of the structure of FIG. 4 and FIG. 6 is a broken sectional view of the structure illustrated in FIG. 4, taken on the line 6—6 thereof.

DESCRIPTION OF THE PREFERRED EMBODIMENT

Referring to the FIGURES, a sleeve 11 has an annular groove 12 cut therein near the top which is cut through to the hollow interior at the portion 10. A wire locking ring 13 is disposed within the groove 12 having a finger portion 14 extending into the open portion 10. The lower end of the sleeve has a slot 15 for receiving the coiled wire insert 16 which is placed therein to rest upon the end of half-thread sections 17 which are in continuation of a like thread 18 in the annular end portion 19 of the sleeve. Alternatively, the half-thread sections can be machined to the helix angle of the wire forms for ease of engagement with the wire forms. The wound wire of the insert is oval-shaped in section with the main axis disposed transversely of the coil and which is wound in a coil larger than the diameter of the thread 18.

A driving member 21 has a square end 22 similar to that of a tap, a handle, or other driving means, (not shown), to facilitate rotation thereof. The member also has an intermediate tapered section 23, a guiding section 24 and a forward threaded section 25. It will be noted in FIG. 2 that the finger portion 14 of the locking ring 13 frictionally engages the member 21 and when the latter is drawn outwardly of the sleeve 11, engages the shoulder of the guide portion 24 and prevents the drive member 21 from being accidentally withdrawn from the sleeve 11.

The threaded end 25 of the member 21 has such a diameter as to freely pass axially into the coiled wire insert 16 until a slot 26 in the forward end receives a diametrically extending tang or end portion 27 of the insert 16. The opposite sides 28 and 29 of the slot 26 sloped in the opposite direction and ride over and receive the tang when the member 21 is driven clockwise and conversely, releases the tang when the member 21 is rotated counterclockwise.

When an insert 16 is to be driven into a tapped hole, it is placed in the interior of the sleeve 11 through the slot 15 and the member 21 is advanced to have the threaded end 25 move into the insert until the tang 27 is engaged by the slot 26. Upon the turning of the member 21 while forcing it forwardly, the wire of the insert will engage the half-thread sections 17 and will be reduced in diameter within the thread 18 as the wire is snaked into the end portion of the threaded section 25 and mated therewith.

After the contraction of the insert within the threaded end 25, as illustrated in FIG. 4, it is carried on the member 21 into the tapped hole 31 of a workpiece 32. After the insert is screwed into the thread 31 from the thread 18, the rotation of the element 21 in reverse direction, the threaded end will be screwed out of the insert and the tool removed from the workpiece. Thereafter the tang 27 may be severed from the end of the insert if a screw is to pass completely through the insert when applied thereto.

We claim:

1. In a tool for inserting a coiled wire insert into a tapped aperture of a workpiece, a hollow member having a cutaway portion and a uniform threaded section at the driving end for the reception of an insert which is of greater outside diameter than the internal diameter of the threaded section, said threaded section having a portion thereof extending into the hollow member at the cutaway portion to have the thread interrupted thereby, a driving element within said member for slidable longitudinal movement therein, and a forward threaded end on said driving element having an outside diameter smaller than the internal diameter of said insert to permit the threaded end to slide thereinto when the element and member are longitudinally slid relative to each other.

2. In a tool for inserting a coiled wire insert into a tapped aperture of a workpiece as recited in claim 1, wherein the insert has a tang on its inner end, and releasable engaging means on the forward threaded end of said driving element for engaging the tang and rotating the insert therewith when the driving element is rotated to advance the coils of the insert into said interrupted portion of the threaded section of the hollow member which reduces the diameter of the coils as the insert is rotated and moves the coils into the thread of the threaded end of the driving element and advances the coils into the continuous thread portion of said threaded section.